(12) United States Patent
Gamble et al.

(10) Patent No.: US 7,786,645 B2
(45) Date of Patent: Aug. 31, 2010

(54) SUPERCONDUCTING MACHINE STATOR

(75) Inventors: Bruce B. Gamble, Wellesley, MA (US); Gregory L. Snitchler, Shrewsbury, MA (US); Darrell Morrison, Blaine, MN (US)

(73) Assignee: American Superconductor Corporation, Devens, MA (US)

( * ) Notice: Subject to any disclaimer, the term of this patent is extended or adjusted under 35 U.S.C. 154(b) by 480 days.

(21) Appl. No.: 11/516,970

(22) Filed: Sep. 7, 2006

(65) Prior Publication Data
US 2008/0061637 A1 Mar. 13, 2008

(51) Int. Cl.
*H02K 1/12* (2006.01)
(52) U.S. Cl. .............. 310/216.005; 310/214; 310/215
(58) Field of Classification Search ......... 310/216–218, 310/214, 215, 194, 196
See application file for complete search history.

(56) References Cited

U.S. PATENT DOCUMENTS

| | | | | |
|---|---|---|---|---|
| 3,334,255 | A * | 8/1967 | Peters | 310/215 |
| 3,735,169 | A * | 5/1973 | Balke et al. | 310/214 |
| 3,943,392 | A * | 3/1976 | Keuper et al. | 310/215 |
| 5,698,917 | A * | 12/1997 | Shultz | 310/87 |
| 5,714,827 | A * | 2/1998 | Hansson | 310/254 |
| 6,972,506 | B2 * | 12/2005 | Onishi | 310/215 |
| 2002/0180284 | A1 | 12/2002 | LeFlem et al. | |
| 2004/0017125 | A1 | 1/2004 | Nakamura et al. | |

FOREIGN PATENT DOCUMENTS

| | | |
|---|---|---|
| JP | 11-122855 | 4/1999 |
| WO | WO 03/021746 | 3/2003 |

OTHER PUBLICATIONS

Malamud "Development, Calculation and Research of Semi-Conducting System for Capacitive Currents Routing in High Power Turbogenerator High Voltage Air-Gap Armature Winding", XP-000792440. pp. 779-788 (1997).

* cited by examiner

*Primary Examiner*—Dang D Le
(74) *Attorney, Agent, or Firm*—Occhiuti Rohlicek & Tsao LLP (57) ABSTRACT

A stator for an electrical machine includes a back iron including a substantially cylindrical annular structure having an inner surface and an axis. A plurality of supports are fabricated of non-magnetic material, each support extending parallel to the axis of the annular structure along the inner surface of the annular structure, each support including a primary base and at least two primary support members. The primary bases substantially conform to the inner surface of the back iron with the primary support members extending radially inward from the primary base towards the axis of the annular structure. A stator winding is positioned between the at least two primary support members and between the primary base of the support and the axis of the annular structure.

24 Claims, 8 Drawing Sheets

SUPERCONDUCTING MACHINE STATOR

This invention arose in part out of research pursuant to Contract No. N00014-03-C-0284 awarded by the Office of Naval Research.

BACKGROUND

Superconducting air core, synchronous electric machines have been under development since the early 1960s. The use of superconducting windings in these machines has resulted in a significant increase in the magneto motive forces generated by the windings and increased flux densities in the machines. These machines operate without iron teeth between the stator coils since the flux density would result in high dissipation in these members. In conventional machines, the coils are surrounded by a laminated stack of iron that acts as a flux path. The laminated stack includes teeth that extend between the coils to provide a flux path and to support the coils. In a superconducting machine a system is required for supporting large loads on the coils that does not have high losses in a large alternating current field.

SUMMARY

In an aspect, a stator for an electrical machine includes: a back iron including a substantially cylindrical annular structure having an inner surface and an axis; a plurality of supports fabricated of non-magnetic material, each support extending parallel to the axis of the annular structure along the inner surface of the annular structure, each support including a primary base and at least two primary support members, the primary base substantially conforming to the inner surface of the back iron, the primary support members extending radially inward from the primary base towards the axis of the annular structure; and a stator winding positioned between the at least two primary support members and between the primary base of the support and the axis of the annular structure. Embodiments can include one or more of the features described below.

In an aspect, a stator winding support assembly for supporting at least a portion of a stator winding of an electrical machine having an annular back iron includes: a primary base fabricated of non-magnetic material, the primary base configured to substantially conform to an inner surface of an annular back iron; and two primary support members extending away from the base, the primary support members and the primary base defining a recess configured to receive and support at least said portion of the stator winding. Embodiments can include one or more of the features described below.

In an aspect, a stator for an electrical machine includes: a back iron including a substantially cylindrical annular structure having an inner surface and an axis; a winding assembly fabricated of non-magnetic material, the winding assembly extending parallel to the axis of the annular structure along the inner surface of the annular structure; a stator winding between the inner surface and the axis of the annular structure, the stator winding supported by the winding assembly; and an insert located adjacent the winding, the insert and the winding defining at least one coolant channel. Embodiments can include one or more of the features described below.

In an aspect, a stator for an electrical machine includes: a back iron including a substantially cylindrical annular structure having an inner surface and an axis; a stator winding between the inner surface and the axis of the annular structure; and a coolant channel defined adjacent the stator winding, the coolant channel having a depth to width ratio of less than about 1 to 5. Embodiments can include one or more of the features described below.

In one aspect, a stator for an electrical machine includes: a back iron including a substantially cylindrical annular structure having an inner surface and an axis; a winding assembly fabricated of non-magnetic material, the winding assembly extending parallel to the axis of the annular structure along the inner surface of the annular structure; a stator winding between the inner surface and the axis of the annular structure, the stator winding supported by the winding assembly, the stator winding including first portions and second portions, the first portions more rigid than the second portions; and an insert located adjacent the winding, the insert and the winding defining at least one coolant channel. Contact between the insert and the winding is primarily on a surface of the first portions of the winding. Embodiments can include one or more of the features described below.

In some embodiments, each support further includes a secondary support assembly, the secondary support assembly including a secondary base and at least two secondary support members, the secondary support members engaging the primary support members to define a cavity receiving the stator winding.

In some cases, the primary base and primary support members comprise a formed fiber aligned composite. In some cases, the secondary base and secondary support members comprise a formed fiber aligned composite.

In some embodiments, the primary support members extend radially inward from the primary base for a distance between about 35 percent and about 65 percent of a height of the stator winding.

Some embodiments also include a sheet-form insert located adjacent the winding, the insert and the winding defining coolant channels. Inserts can include a sheet-form resilient member including a first broad face with an non-planar surface. Inserts can be located between the secondary support assembly and the winding. In some cases, inserts can be less than 0.25 inch in thickness.

In some embodiments, at least three primary support members extend from the primary support base.

In some embodiments, the secondary base contacts a substantially cylindrical annular bore tube located co-axially with the back iron.

In some embodiments, the supports are mounted on the back iron through engagement between mating surface features extending from the primary base and slots defined in the back iron. The supports can include a fiber aligned composite and the surface features extending from the primary base comprise a randomly oriented fiber composite.

In some embodiments, the stator winding comprises a plurality of coils positioned in stacks, the stacks extending radially inward towards the axis of the annular structure.

In some embodiments, coolant channels have a depth to width ratio of less than about 1 to 5. In some cases, coolant channels have a main portion with a depth less than about 0.1 inch.

Some embodiments include a plurality of supports fabricated of non-magnetic material, each support extending parallel to the axis of the annular structure along the inner surface of the annular structure, each support including a primary base and at least two primary support members, the primary base substantially conforming to the inner surface of the back iron, the primary support members extending radially inward from the primary base towards the axis of the annular structure.

In some embodiments, the first portions of the winding comprise a supporting material. In some cases, the supporting material extends between opposite sides of the winding. The supporting material can include a fiberglass composite (e.g., a grade g10 fiberglass composite).

In some embodiments, the winding comprises a coil with multiple wire bundles, the wire bundles separated from each other by a supporting material. In some cases, the supporting material extends from one side of the coil to an opposing side of the coil. In some cases, the supporting material comprises a fiberglass composite.

In an aspect, a method of assembling a stator for an electrical machine includes: providing a back iron as a substantially cylindrical annular structure having an inner surface and an axis; attaching a plurality of supports fabricated of non-magnetic material to the inner surface of the annular structure, the supports extending parallel to the axis of the annular structure along the inner surface of the annular structure, each support including a primary base and at least two primary support members, the primary base substantially conforming to the inner surface of the back iron, the primary support members extending radially inward from the base, the primary support members and the primary base defining a recess in the support; and loading a plurality of coils positioned in stacks into the recess in a support with each stack extending radially inward from the primary base of a support towards the axis of the annular structure. Embodiments can include one or more of the features described below.

In an aspect, a method of assembling a stator for an electrical machine includes: providing a back iron as a substantially cylindrical annular structure having an inner surface and an axis; attaching a plurality of supports fabricated of non-magnetic material to the inner surface of the annular structure, the supports extending parallel to the axis of the annular structure along the inner surface of the annular structure, each support including a primary base and at least two primary support members, the primary base substantially conforming to the inner surface of the back iron, the primary support members extending radially inward from the base, the primary support members and the primary base defining a recess in the support; loading a plurality of coils positioned in stacks into the recess in a support with each stack extending radially inward from the primary base of a support towards the axis of the annular structure, each coil including first portions and second portions, the first portions more rigid than the second portions; and installing a sheet-form insert adjacent a stack of coils, the insert and the stack of coils defining coolant channels, wherein contact between the insert and the winding is primarily on a surface of the first portions of the winding. Embodiments can include one or more of the following features.

Some embodiments also include: installing a plurality of secondary support assemblies, each secondary support assembly including a secondary base and at least two secondary support members, the secondary support members engaging the primary support members; and forming a plurality of combined support assemblies by attaching each secondary support assembly to a matching one of the supports, the combined support assemblies supporting the stacks of coils within the annular structure of the back iron. In some cases, methods also include installing a sheet-form insert adjacent a stack of coils, the insert and the stack of coils defining coolant channels.

In some embodiments, each primary support member has a length extending from an associated primary base that is between about 33% and 75% of a stack height of an adjacent stack of coils.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
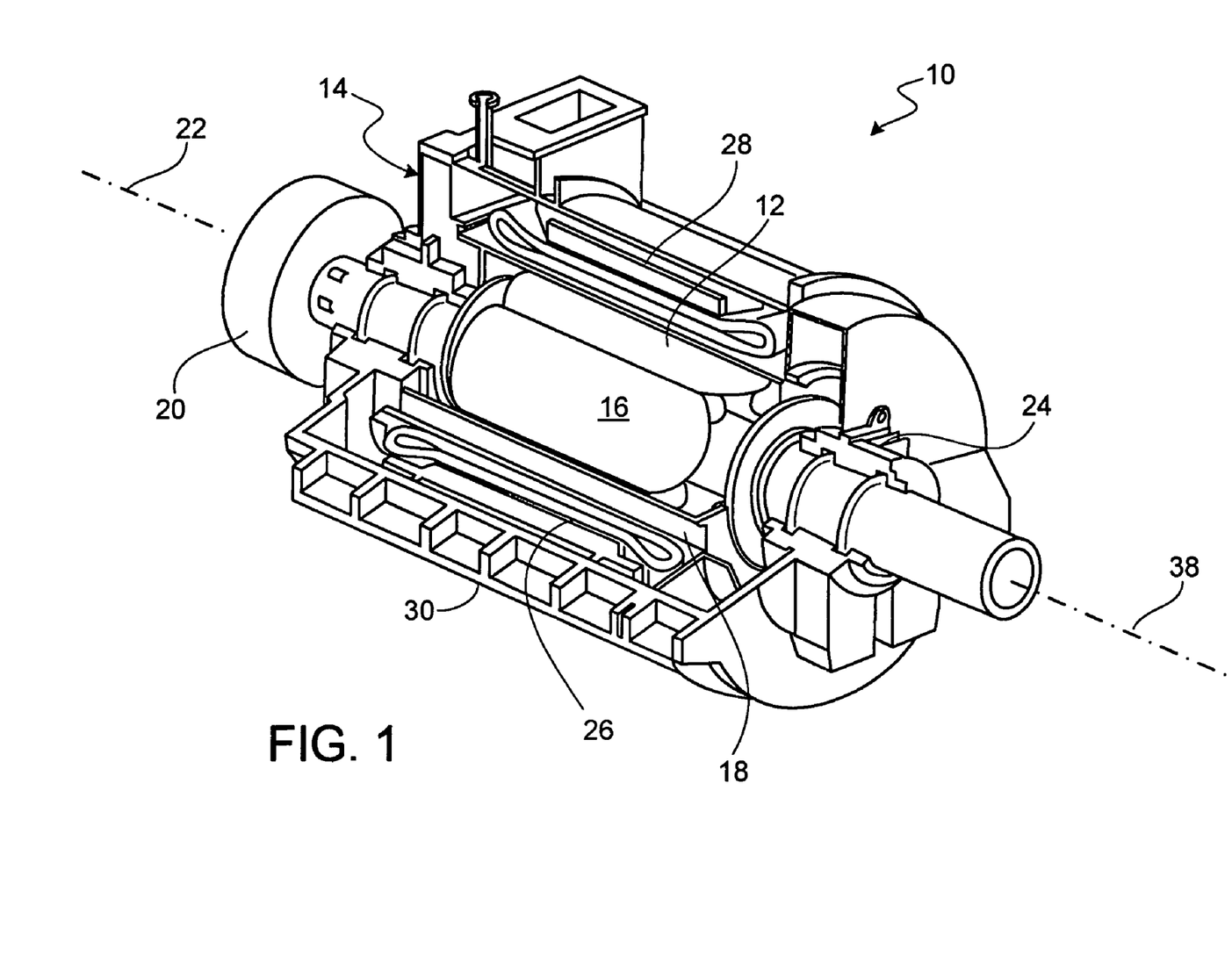
FIG. 1 is a partially cross-sectional perspective view of a superconducting motor.
Figure 1A:
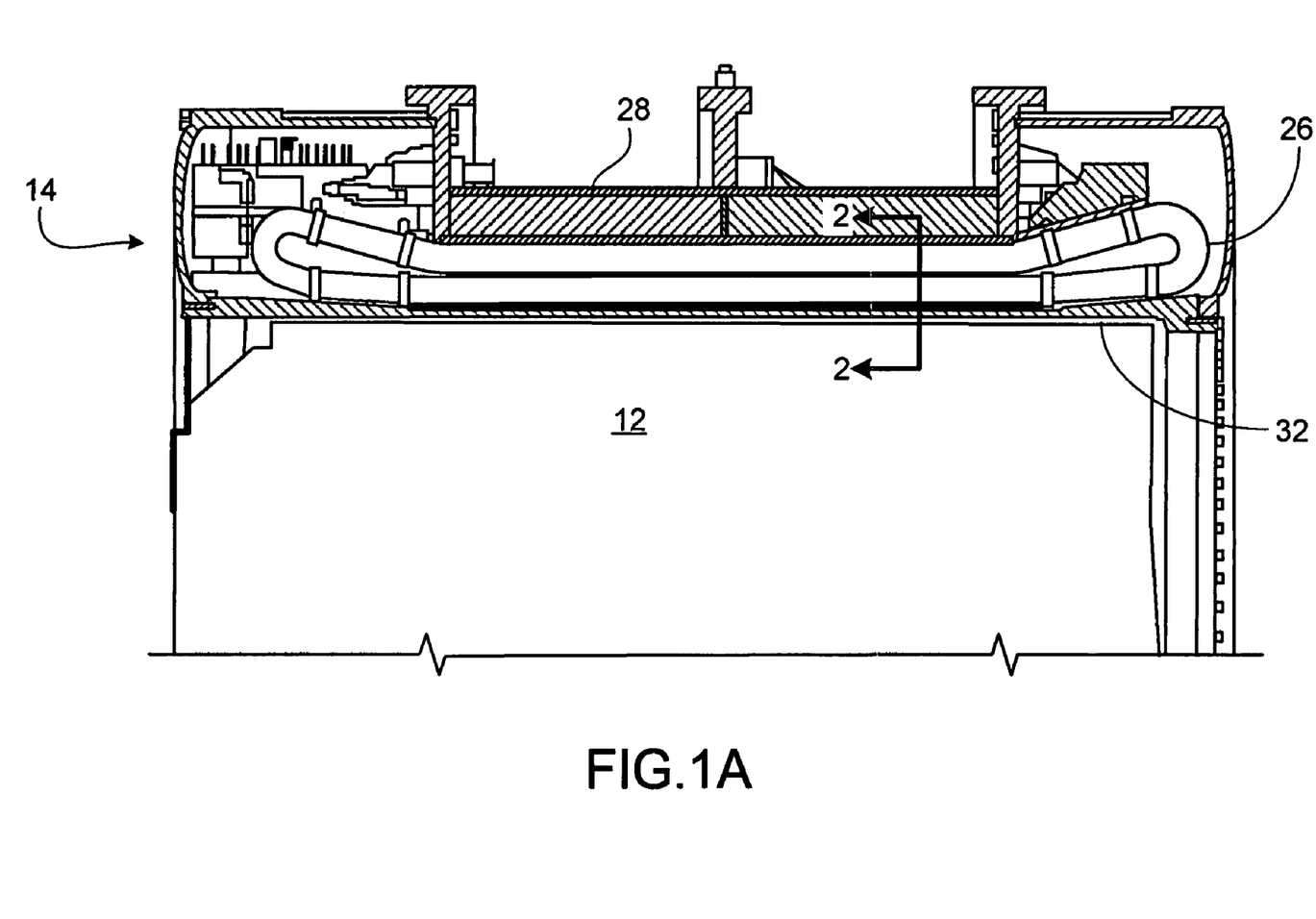
FIG. 1A is a cross-sectional view of portions of the superconducting motor of FIG. 1.

Referring to FIGS. 1 and 1A, a rotating superconducting machine 10 includes a rotor assembly 12 mounted within a stator assembly 14. Rotor assembly 12 includes rotor coils 16 formed of a high-temperature superconductor (HTS), a torque transfer system (not shown), and an electromagnetic (EM) shield 18. In this instance, rotor coils 16 include several HTS sub-coils formed in a racetrack configuration but other configurations are also possible. U.S. Pat. No. 6,509,819, the entire contents of which are incorporated herein by reference, discusses exemplary rotor coil configurations in more detail. Electromagnetic shield 18 consists of a conductive, non-magnetic material that shields rotor coils 16 by attenuating asynchronous fields produced by the stator currents. A brushless exciter 20, the current source for rotor coils 16, consists of a transformer and associated electronics to condition and control the power for the rotor coils. Rotor coils 16 are conduction cooled through a rotor support structure with gaseous helium, which circulates inside machine 10 to cool the HTS rotor coils. The inward and outward flow of the gaseous helium to rotor assembly 12 passes through the coaxial helium transfer coupling 22, a stationary to rotating union. Bearings 24 support rotor assembly 12 within stator assembly 14.

Stator assembly 14 includes stator coils 26, a back iron 28, and a housing 30. Stacks of stator coils 26 are mounted between a stator support tube or bore tube 32 and back iron 28 as will be discussed in more detail below. Back iron 28 surrounds stator coils 26 providing a low reluctance path for the magnetic field and acting as a flux shield for the surrounding area. Back iron 28 is typically made of steel (e.g., low carbon steel) but can also be made of other materials (e.g., lightweight composite materials). Stator housing 30 supports the stator components as well as bearings 24 that orient the rotor shaft to the stator. When rotating superconducting machine 10 is operated as a motor, electrical current supplied to rotor coils 16 and stator coils 26 generates a magnetic flux linking rotor assembly 12 with stator assembly 14 that causes the rotation of the rotor assembly. U.S. Pat. No. 6,489,701, the entire contents of which are incorporated herein by reference, discusses the structure and operation of the above features relative to a similar motor in more detail.

Referring to FIGS. 1, 1A, 2, 2A, and 3, stator assembly 14 of rotating superconducting machine 10 includes non-magnetic supports 34 for supporting stator coils 26. Non-magnetic supports 34 are used, rather than the iron slots typically found in conventional machines, due to the high flux densities produced by the superconductor coils 16. In addition to being non-magnetic, supports 34 preferably have low electrical conductivity to prevent excessive eddy current losses. Non-magnetic supports 34 are mounted on an inner surface 36 of back iron 28 extend parallel to an axis 38 of stator assembly 14. Each support 34 includes a primary base 40 and at least two primary support members 42 with dovetail-like members 41 formed as surface features extending from primary base 40 to engage slots 50 defined by inner surface 36 of back iron 28. Primary support members 42 extending radially inward from the primary base towards axis 38 of stator assembly 14. As is discussed in more detail below, primary support members 42 extend radially inward from primary base 40 for a first height h between about 35 percent and about 65 percent of a overall height H of stator coils 26 that supports 34 are configured to receive which facilitates manufacture of stator assembly 14.

Figure 2:
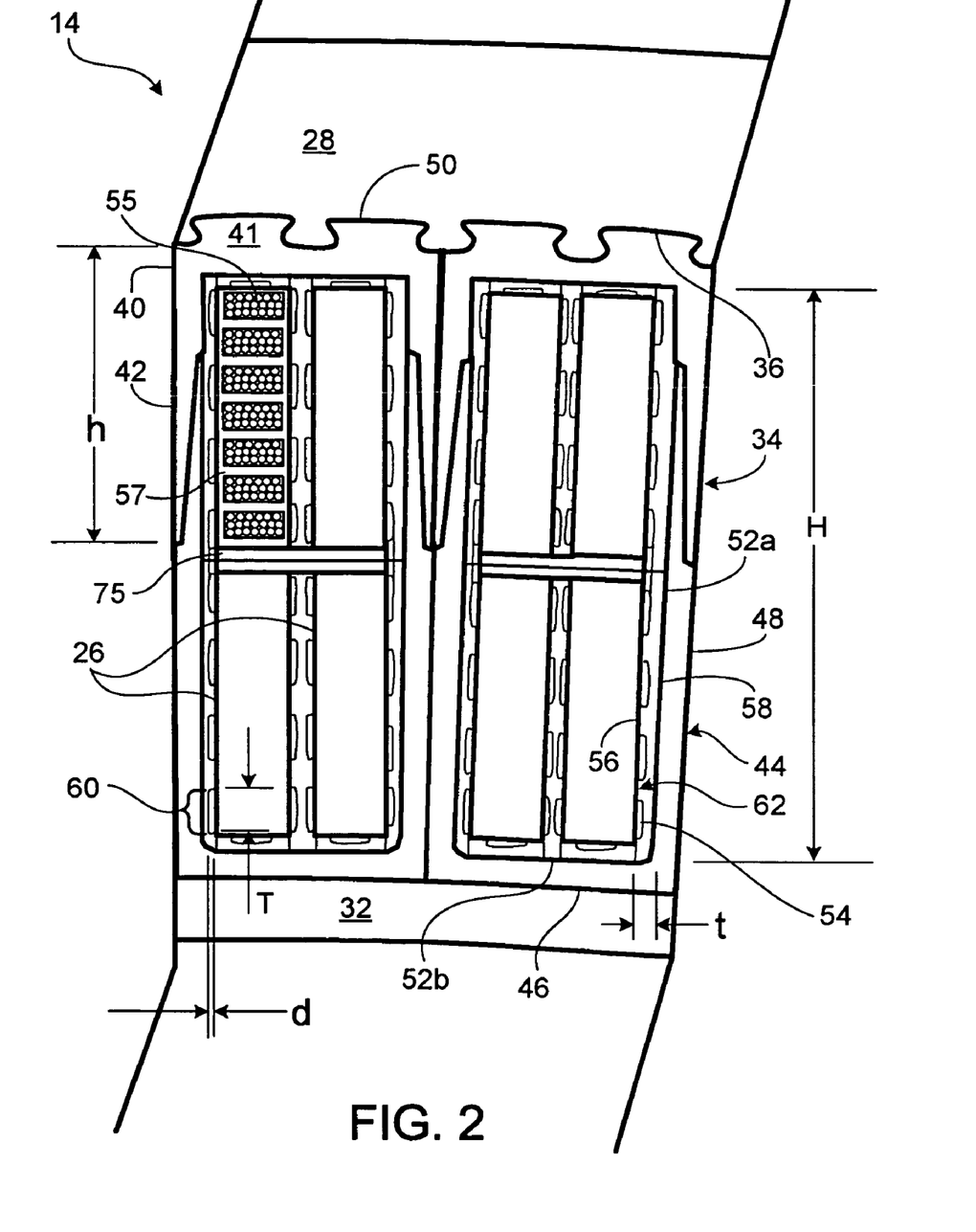
FIG. 2 is a cross-sectional view of the stator assembly taken along line 2-2 indicated in FIG. 1A.
Figure 3:
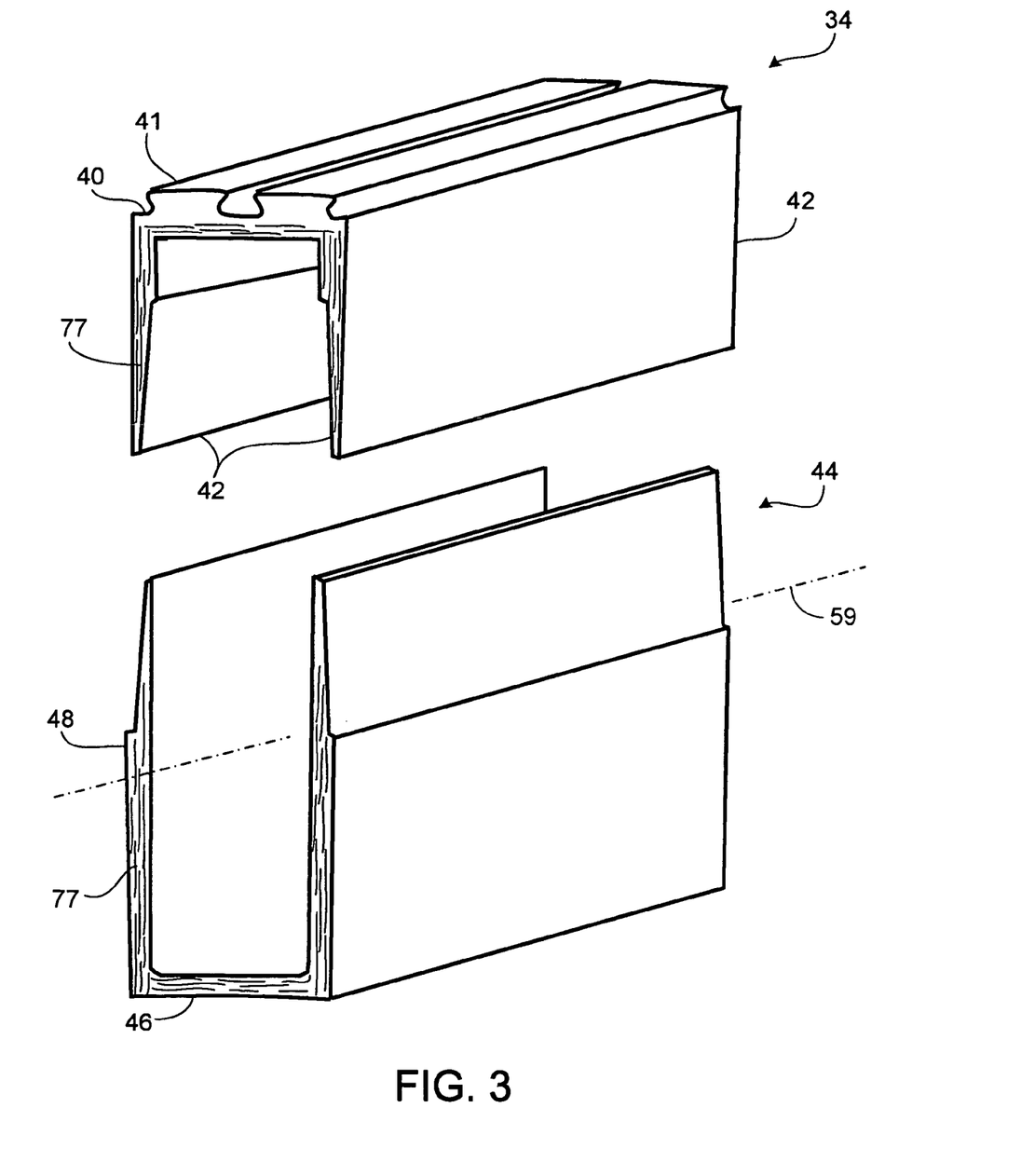
FIG. 3 is an exploded perspective view of a stator support.

In this embodiment, each support 34 also includes a secondary support assembly 44 constructed of a fiber-aligned composite which constitutes a secondary base 46 and two secondary support members 48. Secondary support members 48 engage primary support members 42 to define a cavity receiving stator coils 26 between primary support members 42 as well as between primary bases 40 and axis 38 of stator assembly 14. Secondary base 40 contacts and is supported by bore tube 32 which is located co-axially with back iron 28.

Figures 4A, 4B:
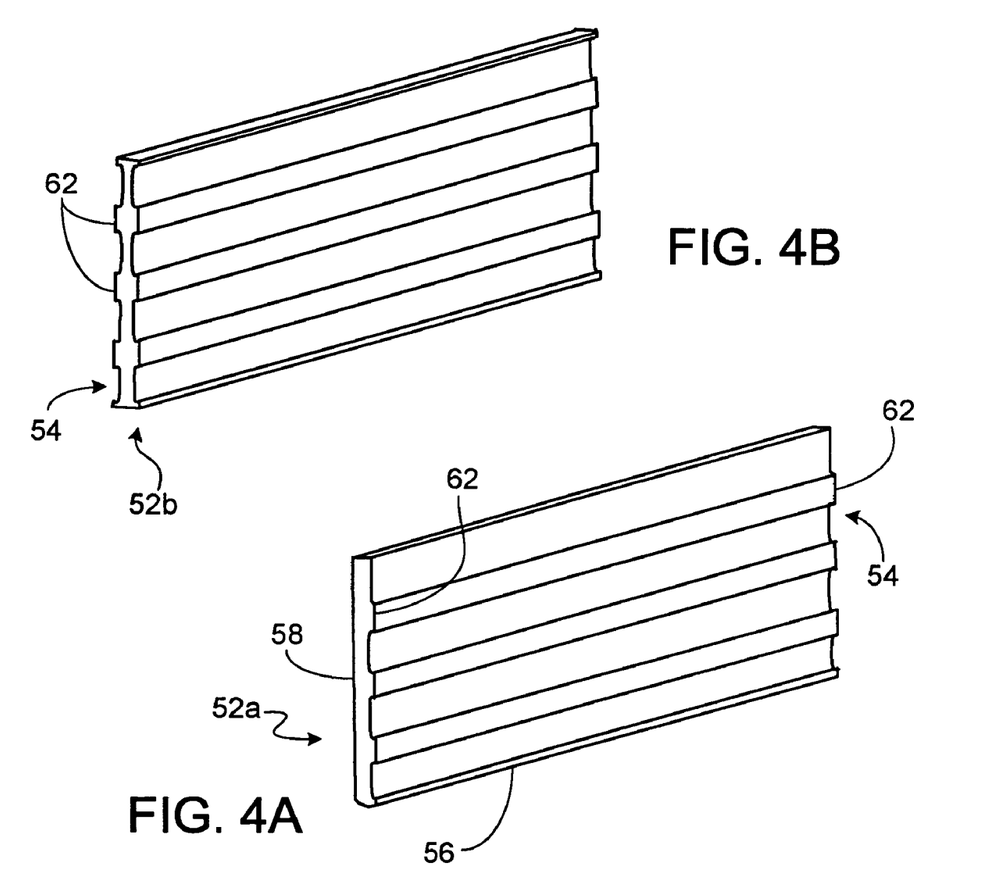
FIGS. 4A, 4B, and 4C are perspective views of inserts for a stator support.
Figure 4C:
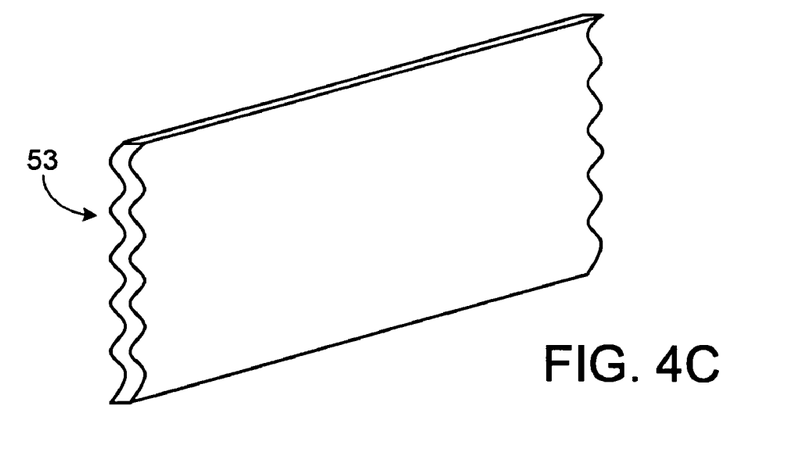

Referring again to FIG. 2 and also to FIGS. 4A, 4B, and 4C, stator assembly 14 also includes sheet-form inserts 52a, 52b located adjacent stator coils 26 and configured to define coolant channels 54 between the stator coils and the inserts. Having supports 34 that are separate from inserts 52a, 52b provides improved support for stator coils 26 by allowing the combination of relatively stiff supports providing structural stability with resilient inserts providing frictional engagement with the stator coils. Inserts 52a, 52b are formed of a resilient material such as, for example, fiberglass plastic laminate and are sized such that the inserts engage outer surfaces of stator coils 26 in a frictional press fit. Such inserts can also be used in conjunction with other stator assemblies (e.g., stator assemblies with individual primary support members directly attached to the back irons of the stator assemblies).

In this embodiment, stator assembly includes both outer inserts 52a and inner inserts 52b. Each outer insert 52a is located between a stator coil 26 and an adjacent support 34 and are formed with a first broad face 56 and a second broad face 58. First broad face 56 has a non-planar surface and second broad face 58 that is substantially flat to conform with surfaces of primary and secondary support members 42, 48. Each inner insert 52b is located between adjacent stator coils 26 and both opposing broad faces have non-planar surfaces. By engaging stator coils 26, laterally extending portions 62 of inserts 52 substantially limit coolant flow to within coolant channels 54. Other embodiments of stator assembly 14 include other inserts such as, for example, ripple springs 53 with opposing faces having matching sinusoidal surfaces located between stator coils 26 and supports 34. In some embodiments, ripple springs can be used in place of inserts 52a (e.g., disposed between supports 34 and coils 26 with grooves associated with the sinusoidal surfaces oriented substantially parallel to support axis 59 to form coolant channels). In some embodiments, ripple springs can be used in addition to inserts 52a (e.g., disposed between supports 34 and inserts 52a with grooves associated with the sinusoidal surfaces oriented substantially perpendicular to coolant channels 54 to help fix the position of the inserts relative to the supports and to limit coolant flow between the supports and inserts).

Referring to FIG. 2, in this embodiment, each stator coil 26 includes multiple Litz wire bundles 55 with a supporting material 57 (e.g., G10 fiberglass composite) providing the coil's overall structural framework as well as separating the individual wire bundles. For the sake of clarity of illustration, FIG. 2 only shows internal structure for a single exemplary stator coil 26. The supporting material 57 extending between wire bundles 55 is more rigid than adjacent portions of coils 26 where the wire bundles are present. Thus, supporting material 57 (e.g., insulation with appropriate structural stability) serves as a bridge and provides increased structural stability to individual coils 26. Inserts 52a, 52b are configured to align laterally extending portions 62 of the inserts with bridges 57 between wire bundles 55. This alignment supports inserts 52 and help maintain the coolant channels 54.

Figure 2A:
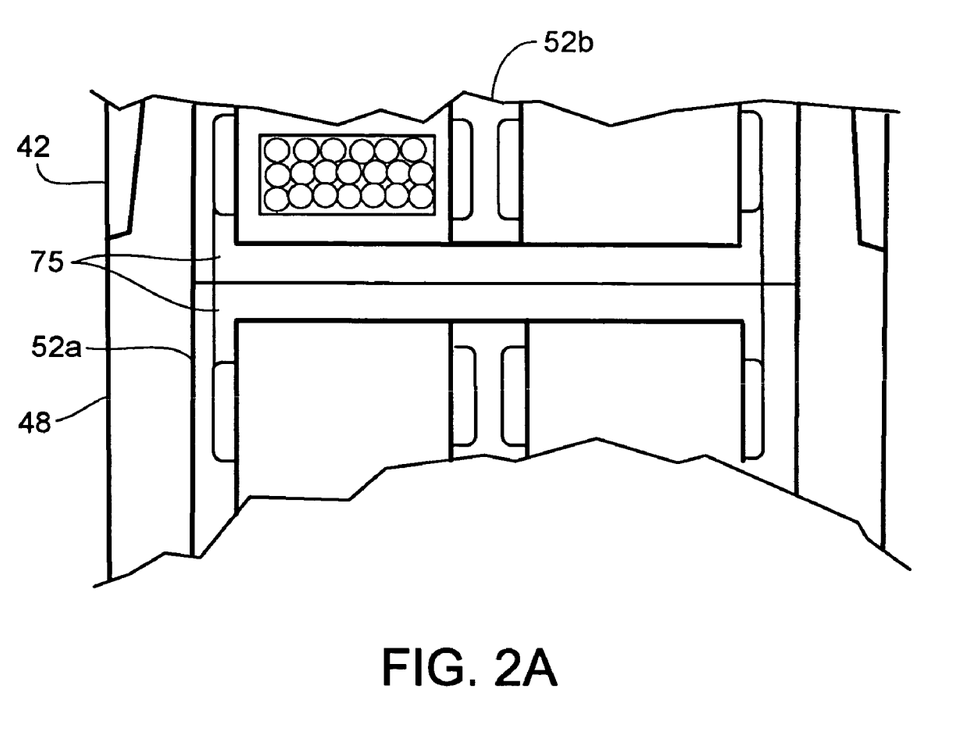
FIG. 2A a cross-sectional view of a portion of the stator assembly of FIG. 2.

Referring to FIGS. 2 and 2A, support 34, as formed by primary base 40, primary support members 42, secondary base 46 and secondary support members 48 provides phase to phase and phase to ground insulation. In some embodiments, U-pieces 75 (e.g., mica-filled U-pieces) are placed between the coils to provide a long tracking path between phases in the top and bottom of the slot. A dielectric fluid permeating the interior stator spaces of stator assembly 14 (e.g., both coolant channels 54 and/or other voids within stator assembly 14) together with support 34, inserts 52a, 52b, and U-pieces 75 constitutes a ground and phase-to-phase insulation system as well as being used as a coolant fluid. This integrated system allows the dielectric fluid to flow close to the stator coils 26 without thick ground wall insulation and can substantially improve heat transfer between the dielectric fluid flowing in the channels and the conductive wire bundles 55.

Referring to FIG. 3, in some embodiments, supports 34, 44 are manufactured of fiber aligned composites to provide additional structural stability. For example, in some instances, the composite forming primary base 40 and primary support members 42 includes fibers 77 that are aligned substantially within planes transverse to a support axis 59 (e.g., extending substantially within the U-shape of a cross-section of the primary base and the primary support members). Primary base 40 and primary support members 42 can also include fibers that are aligned substantially parallel to support axis 59 (e.g. extending into the plane of the cross-section). Members 41 extending from primary base 40 can include randomly oriented fibers. Secondary support assembly 44 can include fibers aligned in a similar fashion.

Coolant channels 54 extend adjacent stator coils 26 and substantially parallel to axis 38 of stator assembly 14 and provide direct contact between a liquid coolant and stator coils 26. The associated efficiency of heat transfer is important because the physical size of superconducting machine 10 is smaller than that of a conventional machine of the same rating with a reduced surface area for cooling. In this instance, coolant channels 54 are configured with a main portion 60 with a depth d of less than about 0.1 inch. Inserts 52 can have a thickness t less than 0.25 inch because coolant channels 54 are shallow. Similarly, at least some of the coolant channels can have depth to width ratio of less than about 1 to 5 to provide good heat transfer efficiency (e.g., a coolant channel with a depth of 0.075 inch and a width 0.5 inch).

To assemble stator assembly 14, back iron 28 is provided as a substantially cylindrical annular structure having an inner surface and an axis. First portions of supports 34 including primary base 40 and primary support members 42 are attached to back iron 28 by engaging slots 50 defined by inner surface 36 of the back iron with surface features 41 extending from the primary base. An epoxy is used to form local bonds between primary bases 40, primary support members 42, and back iron 28. In some embodiments, the epoxy is cured at room temperature. In some embodiments, these local bonds can be formed by heating sections of stator assembly 14 with heaters to cure the epoxy. Because this bonding operation is performed before the stator coils are installed, the bonds can be inspected prior to coil installation.

Stator coils 26 positioned in stacks are then loaded into a recess defined by primary base 40 and primary support members 42 with each stack extending radially inward from the primary base of support 34 towards axis 38 of stator assembly 14. In this instance, stator coils 26 are diamond coils with portions in two separated supports 34 with a portion of each coil sharing a support recess with a portion of another coil in an overlapping configuration. A first throw of stator coils 26 are loaded into stator assembly 14 and temporarily lashed to supports 34. As the rest of the stator coils 26 are installed, a final end-turn lashing is made, holding the stator coils in position. The lifting of the first throw to load the final throw is facilitated by the configuration of primary support members 42 with a height h that is between about 35 percent and 65 percent of the overall height H of the combined coils. Special tooling for locating and holding the top and bottom legs of the coils in position is used while the winding process proceeds.

Secondary support assemblies 44 are then installed with secondary support members 48 engaging primary support members 42. This forms supports 34 substantially enclosing and supporting stacks of stator coils 26 within the annular structure of the back iron 28. In this instance, sheet form inserts 52 are installed adjacent stacks of stator coils 26 at various times during this process depending on the location of particular inserts relative to the stator coils and supports 34.

This method of assembly provides a stator assembly 14 with double-U supports 34 that provide good cooling and mechanical support. In one example, supports 34 were made of a high-modulus fiber aligned composite selected because the high modulus provides stiffness in bending. These high stiffness composites are made by applying techniques similar to those used for aircraft structures, employing a mixture of high strength fiberglass cloths. The composite is hand-layed up, vacuum bagged, and autoclave cured. The result is a composite with a modulus of about 34500 MPa (5 Mpsi). The added stiffness reduces operating deflections. In addition, using composite supports allows the use of higher flux densities through the field windings and, thus, a higher gap shear stress (e.g., above 10 pounds per square inch).

Figure 5:
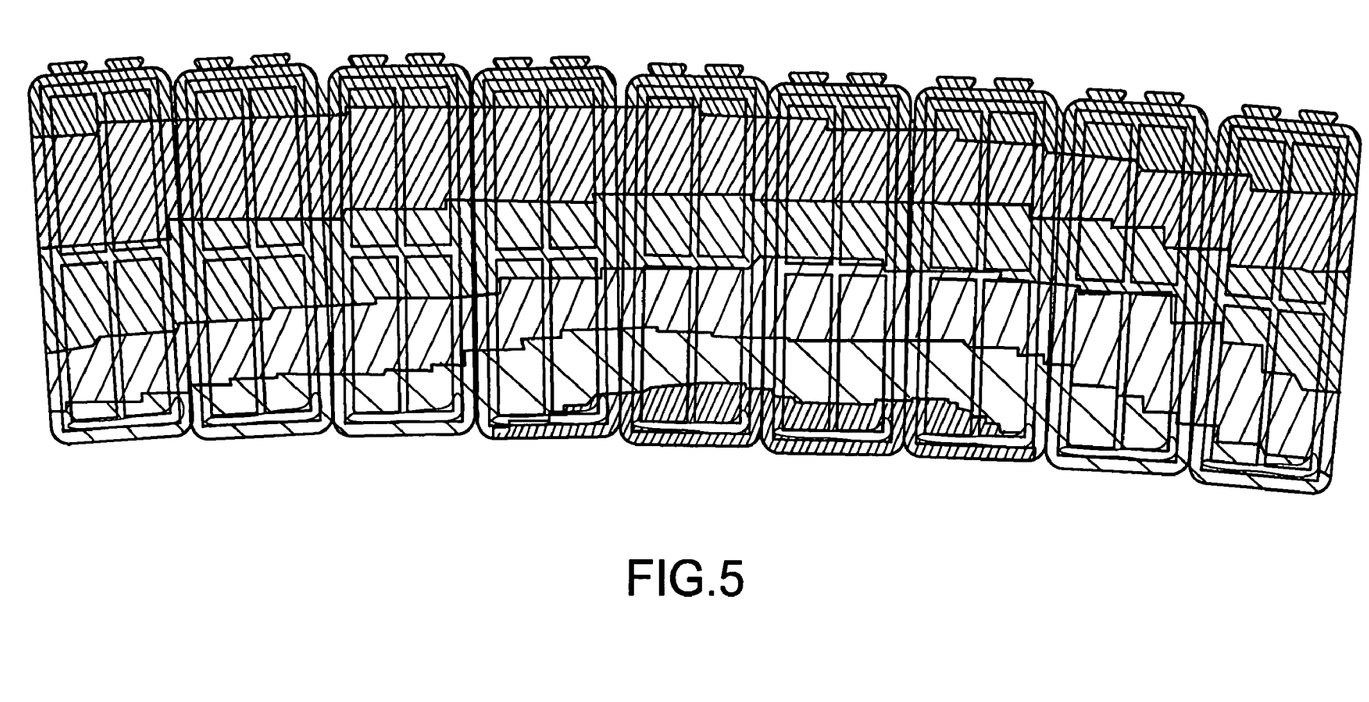
FIG. 5 is a cross-sectional view of a portion of a stator assembly qualitatively representing the distribution of deflections predicted by a finite element analysis of a stress loading to a stator assembly during a worst-case fault condition.

Referring to FIG. 5, a finite element analysis (numerical simulation) of the response of a stator assembly as described above to a stress loading with peak values of 95 MPa at distributed points along the inner surface of stator assembly 14. The event conditions represent anticipated loadings that would occur during a 9-phase fault (i.e., when the worst case scenario of all nine leads of a nine phase system short-circuiting together). FIG. 5 shows a portion of the stator assembly including multiple interlocked supports 34. The shading qualitatively indicates the distribution of deflection predicted by this analysis in different parts of the stator assembly ranging from a maximum predicted deflection of about 0.6 millimeters along the bore tube (not shown—along the inner circumference) to less than about 0.06 millimeters along the back iron (not shown—along the outer circumference). The engagement between adjacent supports 34 is predicted to distribute the imposed stress resulting in a lower maximum point deflection and, consequently, a lower likelihood of structural failure.

Figure 6:
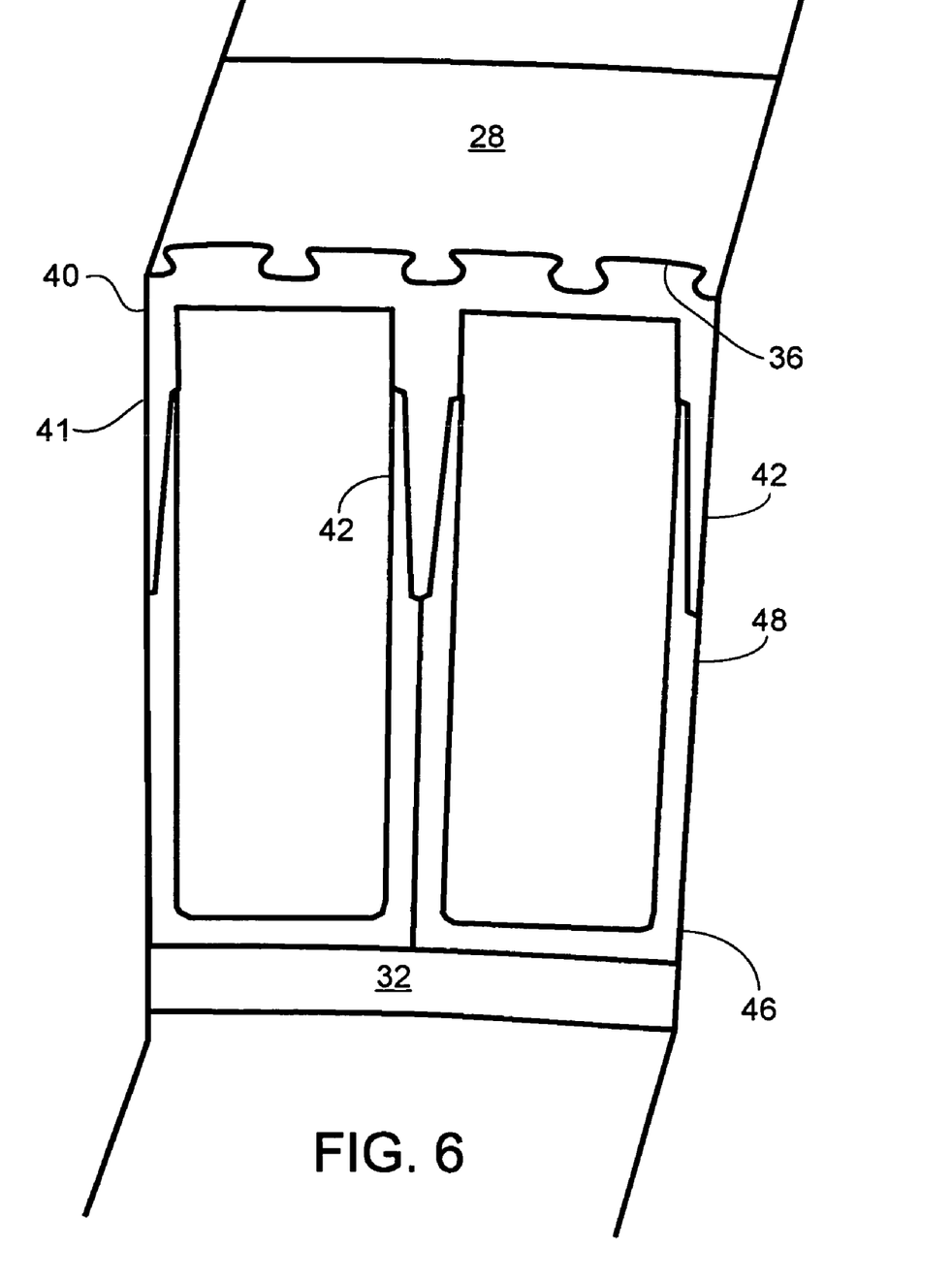
FIG. 6 is a cross-sectional view of an alternate stator support.

A number of embodiments of the invention have been described. Nevertheless, it will be understood that various modifications may be made without departing from the spirit and scope of the invention. For example, referring to FIG. 6, each support could have three or more primary support members 42 extending primary support base 40. Accordingly, other embodiments are within the scope of the following claims.

What is claimed is:

1. A stator for an electrical machine, the stator comprising:
a back iron including a substantially cylindrical annular structure having an inner surface and an axis, the inner surface being defined by an inner diameter of the cylindrical annular structure;
a plurality of supports fabricated of non-magnetic material, each support extending parallel to the axis of the annular structure along the inner surface of the annular structure, each support having a U-shape and including a primary base and at least two primary support members, the primary base substantially conforming to the inner surface of the back iron, the primary support members extending radially inward from the primary base towards the axis of the annular structure; and
a stator winding positioned between the at least two primary support members and between the primary base of the support and the axis of the annular structure.

2. The stator of claim 1 wherein each support further includes a secondary support assembly, the secondary support assembly including a secondary base and at least two secondary support members, the secondary support members engaging the primary support members to define a cavity receiving the stator winding.

3. The stator of claim 2 wherein the primary base and primary support members comprise a formed fiber aligned composite.

4. The stator of claim 2 where the secondary base and secondary support members comprise a formed fiber aligned composite.

5. The stator of claim 2 wherein the primary support members extend radially inward from the primary base for a distance between about 35 percent and about 65 percent of a height of the stator winding.

6. The stator of claim 2 further comprising a sheet-form insert located adjacent the stator winding, the insert and the stator winding defining coolant channels.

7. The stator of claim 6 further comprising a dielectric cooling fluid in the coolant channels.

8. The stator of claim 6 wherein the insert comprises a sheet-form resilient member including a first broad face with an non-planar surface.

9. The stator of claim 8 wherein the insert is located between the secondary support assembly and the stator winding.

10. The stator of claim 6, wherein the stator winding includes first portions and second portions, the first portions more rigid than the second portions; and
wherein contact between the insert and the stator winding is primarily on a surface of the first portions of the stator winding.

11. The stator of claim 10 wherein the first portions of the stator winding comprise a supporting material extending between opposite sides of the stator winding.

12. The stator of claim 11 wherein the supporting material comprises a fiberglass composite.

13. The stator of claim 11 wherein the stator winding comprises a coil with multiple wire bundles, the wire bundles separated from each other by the supporting material.

14. The stator of claim 2 wherein at least three primary support members extend from the primary support base.

15. The stator of claim 2 wherein the secondary base contacts a substantially cylindrical annular bore tube located co-axially with the back iron.

16. The stator of claim 2 wherein the supports are mounted on the back iron through engagement between mating surface features extending from the primary base and slots defined in the back iron.

17. The stator of claim 2 wherein the stator winding comprises a plurality of coils positioned in stacks, the stacks extending radially inward towards the axis of the annular structure.

18. The stator winding support assembly of claim 1 wherein the primary support members extend radially inward from the primary base for a distance between about 35 percent and about 65 percent of a height of the stator winding.

19. The stator winding support assembly of claim 1 further comprising a sheet-form insert sized to extend along a wall of the cavity and configured to engage an outer surface of said portion of the stator winding to define at least one channel for coolant.

20. The stator winding support assembly of claim 19 wherein the insert comprises a sheet-form resilient member including a first broad face with an non-planar surface.

21. The stator winding support assembly of claim 1, wherein at least three primary support members extend from the primary support base.

22. The stator winding support assembly of claim 1, further comprising surface features extending from the primary base of the support assembly, the surface features configured to engage slots defined in a back iron to mount the stator winding support assembly to the back iron.

23. A stator for an electrical machine, the stator comprising:
- a back iron including a substantially cylindrical annular structure having an inner surface and an axis;
- a plurality of supports fabricated of non-magnetic material, each support extending parallel to the axis of the annular structure along the inner surface of the annular structure, each support including a primary base and at least two primary support members, the primary base substantially conforming to the inner surface of the back iron, the primary support members extending radially inward from the primary base towards the axis of the annular structure; and
- a stator winding positioned between the at least two primary support members and between the primary base of the support and the axis of the annular structure, wherein
- each support further includes a secondary support assembly, the secondary support assembly including a secondary base and at least two secondary support members, the secondary support members engaging the primary support members to define a cavity receiving the stator winding,
- the supports are mounted on the back iron through engagement between mating surface features extending from the primary base and slots defined in the back iron, and
- the supports comprise a fiber aligned composite and the surface features extending from the primary base comprise a randomly oriented fiber composite.

24. A stator winding support assembly for supporting at least a portion of a stator winding of an electrical machine having an annular back iron, the support assembly comprising:
- a primary base fabricated of non-magnetic material, the primary base configured to substantially conform to an inner surface of an annular back iron;
- two primary support members extending away from the base, the primary support members and the primary base defining a recess configured to receive and support at least said portion of the stator winding;
- a secondary support assembly, the secondary support assembly including a secondary base and at least two secondary support members, the secondary support members engaging the primary support members to define a cavity configured to receive and support at least said portion of the stator winding; and
- a sheet-form insert configured to be disposed within the cavity and extend along a wall of the cavity between the at least said portion of a stator winding and the primary support members.

* * * * *